Patented July 12, 1938

2,123,734

UNITED STATES PATENT OFFICE 2,123,734

PRODUCTION OF N-VINYL COMPOUNDS

Ernst Keyssner and Werner Wolff, Ludwigshafen-on-the-Rhine, Germany, assignors to I. G. Farbenindustrie Aktiengesellschaft, Frankfort-on-the-Main, Germany No Drawing. Application August 1, 1936, Serial No. 93,884. In Germany August 9, 1935

2 Claims. (Cl. 260—46)

The present invention relates to improvements in producing N-vinyl compounds.

It is well known that N-vinyl compounds may be prepared by acting acetylene at elevated temperatures on pyrrole or an organic compound containing the pyrrole ring in the presence of a substance having a strongly alkaline reaction or in the presence of alkali metals.

We have found that the addition of acetylene to secondary diarylamines and to pyrrole compounds, i. e. pyrrole or compounds containing the pyrrole ring, with the formation of the corresponding N-vinyl compounds can be particularly strongly accelerated by using as the catalyst an alkali metal or a strongly alkaline reacting alkali metal compound together with ammonia or a tertiary heterocyclic base.

As secondary N-diarylamines there may be mentioned diphenylamine, phenyl-para-tolyl-amine, alpha-alpha'-dinaphthylamine, phenyl-alpha-naphthylamine, para-tolyl-alpha-naphthylamine and N-phenyl-2-aminoanthracene.

As compounds containing the pyrrole ring besides pyrrole itself may be mentioned for example indole, carbazole and naphthocarbazole. The compounds obtainable from the said compounds by the addition of hydrogen or by the introduction of other atoms or atomic groups, such as tetra-hydrocarbazole or isopropylcarbazole, may be employed provided that they still contain a free NH-group.

Suitable strongly alkaline reacting alkali metal compounds are especially potassium and sodium hydroxide and alcoholates; compounds of the same metals with the initial materials, as for example carbazole potassium, diphenylamine potassium and the like, may also be employed and these compounds, which are formed by heating the secondary diarylamines or the pyrrole compounds with caustic alkalies, are included in the term "substances having a strongly alkaline reaction" wherever used in the present disclosure.

As tertiary heterocyclic bases may be mentioned in particular pyridine, quinoline, isoquinoline or their derivatives. In many cases even small amounts of the said substances are sufficient to accelerate the addition of the acetylene to the compounds containing the pyrrole ring or to the diarylamines to quite a considerable extent. For example if carbazole be purified by crystallization from pyridine and the resulting carbazole to which traces of pyridine are still adhering be subjected to treatment with acetylene in the presence of strong alkali, the said comparatively small amount of pyridine effects a considerable acceleration in the absorption of acetylene. The substances effecting the acceleration may, however, also be added in larger amounts so that they act at the same time as solvents for the compounds containing the pyrrole ring or for the diarylamines during the treatment with acetylene.

In this way it is not only possible to produce considerably larger amounts of N-vinyl compounds in the same time in a given plant and thus to make better use of the plant, but the addition of acetylene to the initial materials also takes place much more completely in the presence of the said substances than it does when working without the addition of the same.

For the reaction a pressure-tight vessel, for example, may be employed into which the acetylene (advantageously under increased pressure) is led, preferably in admixture with inert gases, such as nitrogen, methane or hydrogen. The reaction may also be carried out in a reaction tower, the operation being in stages or continuous. In this case, the acetylene is preferably led through the tower in a cycle.

The reaction may be carried out in the presence of diluents, such as alcohols, as for example methyl, ethyl or butyl alcohol, glycols, as for example ethylene glycol or diethylene glycol, or hydrocarbons, as for example cyclohexane, benzene, toluene, tetra-hydronaphthalene or deca-hydronaphthalene. Solid compounds, such as carbazole, are preferably made into a paste with a diluent of the said kind or with the corresponding vinyl compound which melts at a much lower temperature than the initial material. The reaction proceeds above 100° C., most favorably between 100° and 250° C.

The N-vinyl compounds obtained may be separated from the alkaline substances and purified by distillation, if desired under reduced pressure, by extraction with suitable solvents or by crystallization.

The following experiment clearly shows the special value and technical advantage of the process according to this invention.

Into each of three identical pressure-tight vessels of about 250 cubic centimeters capacity there are charged 50 grams of carbazole purified by sublimation, 50 cubic centimeters of cyclohexane and 2 grams of potassium hydroxide. The first vessel contains no further additions whereas 2 grams of pyridine are added to the second vessel. After expelling the air from the vessels and pressing in 3 atmospheres of nitrogen, the vessels are heated to 180° C. and acetylene is pressed in until the pressure amounts to from 20 to 25 atmospheres while continuously shaking the vessels. In the third vessel, ammonia gas is used instead of nitrogen for the dilution of the acetylene. When the absorption of acetylene has ceased, the contents of the vessels are diluted with from about 50 to 100 cubic centimeters of cyclohexane, heated slightly and filtered. The unconverted carbazole remains on the filter and the amount of the same constitutes a measure of the degree of conversion. The effect of the addition of pyridine or ammonia may be seen from the following values:—

| Addition | Grams | Duration of experiment | Acetylene absorption | Amount of unconverted carbazole |
|---|---|---|---|---|
|  |  | Hours 14.5 | 7.0 | 8.6 |
| Pyridine | 2 | 9.5 | 7.0 | 6.3 |
| Ammonia | 0.3 | 8 | 9.5 | 1.5 |

In another series of experiments with carbazole which had been twice sublimed, the following values were obtained:

| Addition | Grams | Duration of experiment | Acetylene absorption | Amount of unconverted carbazole |
|---|---|---|---|---|
|  |  | Hours 40 | 4.0 | 23.5 |
| Quinoline | 1 | 18 | 8.0 | 4.5 |
| 8-hydroxy-quinoline | 1 | 19 | 8.2 | 1.0 |
| 8-hydroxy-quinaldine | 1 | 14 | 8.5 | 0 |

The N-vinyl carbazole formed in the reactions of the above experiments can be separated by distillation or crystallization. It melts at from 62–64° centigrade.

The following example will further illustrate how this invention may be carried out in practice, but the invention is not restricted to this example. The parts are by weight.

*Example*

300 parts of diphenylamine are treated at 180° C. with acetylene in the presence of 9 parts of potassium hydroxide and 15 parts of pyridine in a rotary pressure-tight vessel in the manner described above. After 8 hours, the absorption of acetylene amounts to 45 parts. If the same experiment be carried out without the addition of pyridine, it requires 15 hours before 45 parts of acetylene have been added on.

The N-vinyl diphenyl amine formed can be purified by distillation under reduced pressure or by crystallization from ethanol. It melts at from 52–54° centigrade.

What we claim is:

1. In the process of producing N-vinyl carbazole by reacting acetylene at a temperature above 100° C. with carbazole, the step which comprises using as a catalyst a substance selected from the group consisting of the alkali metals and strongly alkaline reacting alkali metal compounds and a substance selected from the group consisting of ammonia and tertiary heterocyclic bases.

2. In the process of producing N-vinyl carbazole by reacting acetylene in the presence of an inert organic diluent at a temperature above 100° C. with carbazole, the step which comprises using as a catalyst potassium hydroxide, and pyridine.

ERNST KEYSSNER.
WERNER WOLFF.